United States Patent Office 3,321,915
Patented May 30, 1967

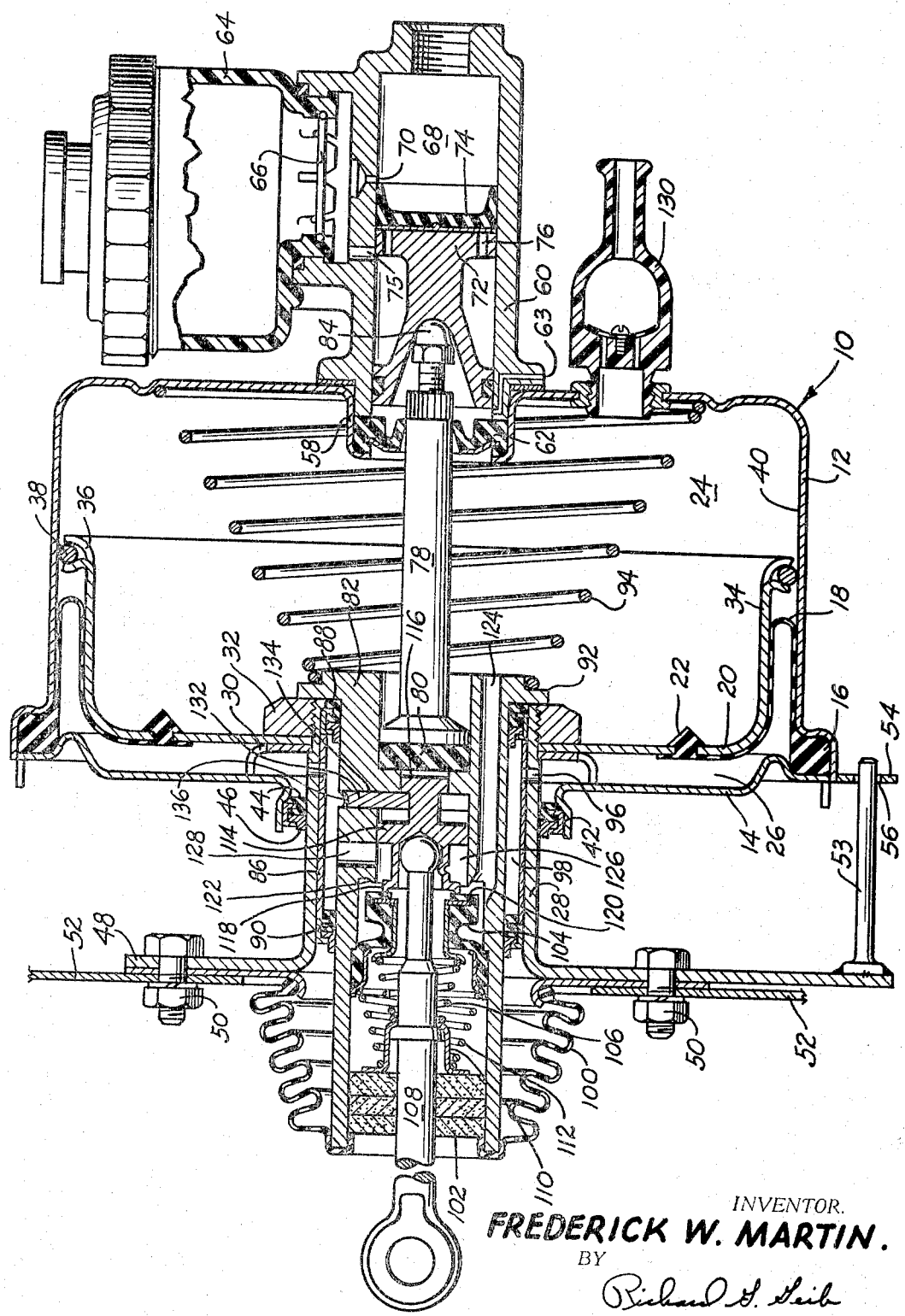

3,321,915
FLUID PRESSURE SERVOMOTOR
Frederick W. Martin, South Bend, Ind., assignor to The Bendix Corporation, South Bend, Ind., a corporation of Delaware
Filed June 28, 1965, Ser. No. 467,283
9 Claims. (Cl. 60—54.5)

It is a principal object of this invention to provide a fluid pressure servomotor requiring minimum travel to operate a control valve therefor during power applications. While this invention relates to fluid pressure servomotors in general, a specific application conceived at this time is in the braking system of an automobile where it has been desirous to equate brake pedal and accelerator pedal height on the floor boards. Furthermore, there has been a recent interest in the automotive industry to provide a servomotor having minimum travel for operation of a brake with maximum control.

It is a principal object of this invention to provide a servomotor to meet the demands of industry.

It is another object of this invention to provide a servomotor whose control valve is arranged to permit travel only to the extent of valve operation during powered operation of the servomotor with provisions to provide for manual follow-through during no power conditions.

It is a still further object of this invention to provide a control valve for a servomotor that is operatively connected to fixed structure to support a recipirocating servomotor and which is operatively connected to a pressure producing apparatus to be movable relative to said servomotor during no powered condition to provide manual actuation of the pressure producing apparatus.

Other objects and advantages will appear from the following description of the appended drawings in which a cross sectional view of a servomotor in accordance with the principles of my invention is portrayed.

With more particular reference to the drawing, I have shown a servomotor 10 comprising a forward shell 12 and a rearward shell 14 that are operatively connected together as by the teachings of the Price et al. Patent No. 3,083,698, issued Apr. 2, 1963, and assigned to the common assignee. As seen, when the shells are joined together a diaphragm bead 16 is compressed between the shells to seal an internal chamber of the servomotor.

In addition, a diaphragm 18 extending radially inwardly from the bead and connected to a back-up plate 20 as by resilient plugs 22 sealingly divide the internal chamber into a first variable volume chamber 24 and second variable volume chamber 26. The plate 20 is joined to a tubular collar 28 and held thereto between a stop plate 30 and a gland nut 32. The plate 20 is also provided with a forwardly extending annular flange 34 that terminates in an annular groove 36 for supporting a Teflon O-ring 38 providing a bearing support for an inner surface 40 of the forward shell 12.

The rearward shell 14 is provided with a central opening to which a bearing support member 42 that has a seal 44 and bearing 46 joined therewith to support the rear shell on the tubular collar 28 while maintaining the integrity of the internal chamber for the servomotor 10.

As seen, the tubular collar 28 is provided with a radiating flange 48 which is held by a plurality of bolts 50 to a firewall 52 of the vehicle to which it is to be mounted. The radiating flange 48 on the lower side extends below the servomotor shells and has welded thereto a guide pin 53 that extends through a depending plate 54 from the rear shell 14 to an opening 56 thereof to provide a further guide for the servomotor 10 in its reciprocation on the collar 28.

To the forward end of the servomotor 10 and through an opening provided by inwardly turned portions 58 of the forward shell 12 I have mounted a master cylinder body 60 which is held to the forward shell against a seal 62 within the inward turned portions 58 by means of bolts or the like (not shown). As seen I have provided an atmospheric vent 63 for the area ahead of seal 62 to preclude the trapping of air in this area.

The master cylinder is of conventional type having a fluid reservoir 64 attached thereto as by means of an expander ring 66 from which reservoir is opened to an internal chamber 68 of the master cylinder as by a radial passage 70. Also I have provided a master cylinder piston 72 with a seal 74 for pressurizing fluid within the chamber 68. In addition, the master cylinder is of a construction to provide an additional passage 75 from the reservoir 64 to the master cylinder as a fluid replenishing means for the chamber 68, via passages 76 in the piston 72 to prevent vacuum from creating an air block in the hydraulic braking system supplied by the master cylinder.

The master cylinder piston 72 is connected by a link 78 to a reaction disc 80 located in a valve body 82. As seen, this link is provided with an adjustable head 84 to provide tolerance adjustments in the assembly of the master cylinder to the servomotor and the link 78 to the valve body 82.

The valve body 82 is reciprocably mounted to the tubular collar 28 by a bearing seal support sleeve 86 having seal type bearings 88 and 90 similar to the bearing supporting the rear shell 14 on the tubular collar 28. Futhermore, the valve body 82 is provided with a radial flange 92 that is normally held against the gland nut 32 by a variable rate spring 94 biased between the front shell 12 and the radial flange 92. The bearing sleeve 86 and the tubular collar 28 are provided with openings to form one or more passages 96 leading from a control chamber 98 between the valve body 82 and the sleeve 86 to the rear or second variable volume chamber 26.

As seen, the valve body 82 projects through the firewall 52 and is provided with a flexible boot assembly 100 which is held to a retainer plate. The plate is in turn held upon the firewall by the bolts 50, as shown, to prevent dirt and other contaminants from entering the servomotor. At its rearmost end the valve body is provided with an air filter 102 to further eliminate contamination of the servomotor and valve body. Internally of the valve body, aside from the disc 80 between the filter 102 and the disc I have mounted a poppet valve 104 which is biased forwardly by a spring 106 between a valve operating rod 108 that may be connected to a brake pedal within the driver's compartment of a vehicle (not shown). In addition, I have mounted a spring retainer 110 to the push rod 108 and the valve body 82 to bias the push rod 108 to the rear due to a return spring 112 acting therebetween. At its forwardmost end the push rod 108 is joined to a valve plunger 114 that has a reaction face 116 at one end and a rearwardly facing valve seat 118 at the other.

As seen, in the released position, the valve seat 118 is abutting a forward face 120 of the valve poppet to prevent escape of air passing from the filter 102 internally of the hollow valve poppet. Furthermore the valve body 82 is provided with a rearwardly facing valve seat 122 which, in the release position, is spaced from the forward face 120 of the valve poppet 104. The valve body 82 is also provided with an axial passage 124 communicating the front or first variable volume chamber 24 to a valve chamber 126 and through a radial passage 128 to the control chamber 98 from whence it passes through passage 96 to the second variable volume chamber 26, thereby suspending the diaphragm 18 and plate 20 in the pressure communicated to the first variable volume chamber 24 by means of a power source connection with a check valve 130. Such a power source in the embodiment shown would be the intake manifold of the vehicle engine (not shown), to thereby suspend the diaphragm and plate in a vacuum.

In operation the vehicle operator will depress the brake pedal to push the control rod 108 forwardly until such time as the face 120 of poppet 104 abuts upon the rearwardly facing valve seat 122 of the valve body 82. In this position, the vacuum communication by means of the axial passage 124 is closed off from the valve chamber 126 and it may be said that the control valve is in a lapped condition. Upon further depression of the brake pedal, the rearwardly facing seat 118 is removed from the forward face 120 of the valve poppet 104 to communicate the atmospheric air pressure via filter 102 to the valve chamber 126 and consequently to the second variable volume chamber 26. As the valve body 82 is held by spring 94 to the fixed tubular collar 28, the atmospheric air pressure in chamber 26 will draw the servomotor 10 rearwardly on the tubular collar 28 to compress the spring 94 and draw the master cylinder 60 rearwardly with respect to the piston 72 to pressurize the chamber 68 thereof.

In the event of power-run-out or in the event of a power failure, the push rod 108 may be further forced to about a key 132 within a slot 134 of the valve body 82 and held therein by a spring retainer 136. Upon abutting this key, the valve body 82 may be projected forwardly of the tubular collar 28 to reciprocate the piston 72 forwardly in the chamber 68 of the master cylinder 60 thereby developing further braking pressures or manually developing a brake pressure for the baking system of the associated vehicle.

In that I have merely described a preferred embodiment of my invention, I do not wish to be limited by such description but rather by the scope of the appended claims.

I claim:
1. A fluid powered servomotor for use in a vehicle, said servomotor comprising:
   a fixed panel in said vehicle;
   a valve housing including a tubular collar affixed to said fixed panel and a tubular valve body arranged to reciprocate in said collar;
   a servomotor housing reciprocally arranged on said tubular collar;
   a wall in said servomotor housing separating the internal area of said housing into a first variable volume chamber and a second variable volume chamber, said wall being affixed to said tubular collar, said housing having bearing seal means sealing an operative connection between said housing and said tubular collar;
   a master cylinder affixed to said housing having a master cylinder piston operatively arranged in a cylinder bore, which piston operatively controls the development of a pressure in said master cylinder;
   a link operatively connecting said valve body and said piston including a means to proportion reaction pressures on said piston;
   a valve actuating member operatively connected to said valve body to control fluid flow therethrough, said valve body arranged to receive reaction forces from said means proportioning reaction pressures on said piston of said master cylinder; and
   means to communicate at least two different pressure sources to said valve body to be controlled by said valve actuating member to pull said servomotor housing and said master cylinder as a unit towards said fixed structure or release said housing while maintaining said valve body and said piston to limit travel of said valve actuating member.

2. A fluid powered servomotor comprising:
   a valve housing including a tubular collar affixed to a fixed structure and a tubular valve body arranged to reciprocate in said tubular collar;
   a servomotor housing reciprocally arranged on said tubular collar;
   a wall in said servomotor housing separating the internal area of said housing into a first variable volume chamber and a second variable volume chamber, said wall being affixed to said tubular collar and said housing having bearing seal means sealing an operative connection between said housing and said tubular collar;
   a master cylinder affixed to said housing having a master cylinder piston operatively arranged in a cylinder bore behind a discharge port, which piston operatively controls a passage into said bore from a hydraulic reservoir to replenish fluid in said master cylinder and release pressures therein when said piston is in its nonactuated position;
   a link operatively connecting said valve body and said piston including a means to proportion reaction pressures on said piston;
   a valve actuating member operatively connected to said valve body to control fluid flow therethrough, which valve actuating member is arranged to receive a reaction force from said means proportioning reaction pressures on said piston of the master cylinder; and
   means to communicate at least two different pressure sources to said valve body to be controlled by said valve actuating member to pull said servomotor housing and said master cylinder as a unit towards said fixed structure or release said housing while maintaining said valve body and said piston to limit travel of said valve actuating member.

3. A fluid powered servomotor according to claim 2 and further comprising a resilient means to maintain a spaced relationship between said servomotor housing and said fixed structure before operating said valve actuating member and after release of same, which resilient means is operatively connected to said servomotor housing and said valve body.

4. A fluid powered servomotor according to claim 2 wherein said valve body is arranged in said tubular collar to move forwardly relative to said collar for manually operating said piston in said master cylinder.

5. A fluid powered servomotor according to claim 2 wherein said valve body includes a first axial passage leading inwardly from said first variable volume chamber to a valve chamber, a radial passage leading from said valve chamber to a passage through said tubular collar opening into said second variable volume chamber, a hollow valve poppet operatively connected to said valve actuating member and to said valve body, which poppet receives fluid pressure internally from a second axial passage in said valve body, a valve seat means on said valve body forwardly of said valve poppet, a valve plunger affixed to said valve actuating member and said valve body and biasing means to engage said valve plunger and said valve poppet in absence of force on said valve actuating member to suspend said movable wall in equal pressures until said poppet engages said valve seat and said plunger moves away from said poppet to create a pressure differential between said first and second variable volume chambers.

6. A fluid powered servomotor according to claim 2 and further comprising a guide means affixed to said fixed structure and operatively connected to said servomotor housing to prevent binding and unnecessary wear of said bearing seal.

7. A fluid powered servomotor according to claim 2 and further comprising an annular stop plate to space said wall from said servomotor housing in the released attitude, said stop plate being affixed to said tubular collar.

8. A fluid powered servomotor according to claim 2 and further comprising guide means affixed to said wall to reciprocally support said housing a spaced distance forwardly of said tubular collar.

9. A fluid powered servomotor according to claim 8 wherein said guide means includes a member formed of a dry lubricant composition to lessen friction in contact with said servomotor housing.

No references cited.

MARTIN P. SCHWADRON, *Primary Examiner.*

R. R. BUNEVICH, *Assistant Examiner.*